(12) United States Patent
Chiu

(10) Patent No.: US 9,901,808 B2
(45) Date of Patent: Feb. 27, 2018

(54) ROLLER

(71) Applicant: Zeleritaz Racing Sports Limited, Hong Kong (HK)

(72) Inventor: Chak Him Lawrence Chiu, Hong Kong (HK)

(73) Assignee: Zeleritaz Racing Sports Limited, Hong Kong (HK)

( * ) Notice: Subject to any disclaimer, the term of this patent is extended or adjusted under 35 U.S.C. 154(b) by 0 days.

(21) Appl. No.: 14/902,336

(22) PCT Filed: Aug. 6, 2014

(86) PCT No.: PCT/CN2014/083800
§ 371 (c)(1),
(2) Date: Dec. 30, 2015

(87) PCT Pub. No.: WO2015/158068
PCT Pub. Date: Oct. 22, 2015

(65) Prior Publication Data
US 2016/0136509 A1   May 19, 2016

(30) Foreign Application Priority Data
Apr. 17, 2014  (HK) .................................. 14103724.1

(51) Int. Cl.
  *A63C 17/22*   (2006.01)
  *B60B 31/00*   (2006.01)
(52) U.S. Cl.
  CPC ............ *A63C 17/22* (2013.01); *A63C 17/223* (2013.01); *B60B 31/00* (2013.01)

(58) Field of Classification Search
CPC ... A63C 17/22; A63C 17/223; B60B 33/0028; B60B 33/0039
USPC ................................. 301/5.301, 5.306, 5.309
See application file for complete search history.

(56) References Cited

U.S. PATENT DOCUMENTS

| 929,570 | A | * | 7/1909 | Driefer | ..................... | B60B 9/06 |
| | | | | | | 152/16 |
| 3,312,505 | A | * | 4/1967 | Hutchins | .................. | B60B 7/10 |
| | | | | | | 301/37.29 |
| 5,308,152 | A | * | 5/1994 | Ho | ......................... | A63C 17/06 |
| | | | | | | 152/323 |

(Continued)

FOREIGN PATENT DOCUMENTS

FR   2875143 A1 *  3/2006  ........... A63C 17/223

*Primary Examiner* — S. Joseph Morano

(57) ABSTRACT

A roller includes a rim assembly and a tire assembly. The tire assembly includes a support ring and a tire mounted at the periphery of the support ring. The support ring and the rim assembly are detachably connected by a buckle structure. The buckle structure includes a plurality of elastic accommodating parts disposed on the inner side of the supporting ring, and a plurality of buckling parts disposed at the rim assembly. The elastic accommodating parts and the buckling parts are detachably connected. The elastic accommodating parts protrude out of the inner side of the support ring, and two ends of each elastic accommodating part are separately provided with a protruding first limiting block and a protruding second limiting block. The buckling parts are limited by the first limiting blocks and the second limiting blocks. The rim assembly and the tire assembly of the roller are detachably connected.

12 Claims, 12 Drawing Sheets

(56) References Cited

U.S. PATENT DOCUMENTS

| | | | | |
|---|---|---|---|---|
| 5,478,140 | A * | 12/1995 | Racosky | B60B 5/02 |
| | | | | 301/105.1 |
| 5,667,280 | A * | 9/1997 | Hansen | A63C 17/223 |
| | | | | 152/323 |
| 6,176,554 | B1 * | 1/2001 | Huang | A63C 17/22 |
| | | | | 301/5.7 |
| 6,439,671 | B1 * | 8/2002 | Lehnhardt | B21C 23/14 |
| | | | | 29/894.341 |
| 8,590,984 | B2 * | 11/2013 | Morris | B65F 1/1473 |
| | | | | 301/111.01 |
| 8,863,794 | B2 * | 10/2014 | Wichern | B62K 25/04 |
| | | | | 152/103 |
| 9,320,962 | B2 * | 4/2016 | Krell | A63C 17/223 |
| 2013/0200583 | A1 * | 8/2013 | Morris | B65F 1/1473 |
| | | | | 280/47.26 |
| 2014/0034198 | A1 * | 2/2014 | Wichern | B62K 25/04 |
| | | | | 152/18 |

* cited by examiner

ROLLER

TECHNICAL FIELD

The present invention relates to a roller, which is particularly applicable to sports equipment. For example, this roller may be used on in-line roller skates.

DESCRIPTION OF THE BACKGROUND

In-line roller skates are common sports equipment and widely used by professional athletes and amateurs. A current in-line roller skate comprises a shoe and rollers installed at shoe bottom. The rollers of an in-line roller skate are arranged on a line.

During use, in-line roller skates need to endure much lateral friction force and need to have enough contact with the ground, so the tires are liable to wear. After wear, their road holding capacity, friction performance and rolling capacity will be affected, so worn rollers need to be replaced in time.

The current rollers typically are in an integral body. Worn rollers need to be replaced integrally. In other words, in order to replace a worn tire, the hub and spokes should also be replaced together with the tire, causing great waste.

Therefore, an improvement scheme is needed.

SUMMARY OF THE INVENTION

The object of the present invention is to improve the environmental friendliness of the rollers and reduce waste. For this purpose, the present invention provides a roller, comprising a rim assembly and a tire assembly. The tire assembly comprises a support ring and a tire mounted at the periphery of the support ring. The support ring and the rim assembly are detachably connected by a buckle structure.

In a preferred embodiment of the present invention, the buckle structure comprises a plurality of elastic accommodating parts disposed on the inner side of the supporting ring, and a plurality of buckling parts disposed at the rim assembly. The elastic accommodating parts and the buckling parts are detachably connected.

In a preferred embodiment of the present invention, the elastic accommodating parts protrude out of the inner side of the support ring, two ends of each elastic accommodating part are separately provided a protruding first limiting block and a protruding second limiting block; the buckling part is limited by the first limiting block and the second limiting block.

In a preferred embodiment of the present invention, each of the buckling parts is also provided with a buckling groove to accommodate the elastic accommodating part; the side wall of the buckling groove limits the elastic accommodating part, and the first limiting block and the second limiting block limit the buckling part to prevent circumferential and axial relative movement of the support ring and the rim assembly.

In a preferred embodiment of the present invention, the end of the elastic accommodating part having a first limiting block is a free end.

In a preferred embodiment of the present invention, the circumferential surface of the support ring has a protruded reinforcement hoop, which is inlaid in a corresponding receiving groove set inside the tire.

In a preferred embodiment of the present invention, the support ring and the reinforcement hoop are made of different materials. The outer circumferential surface of the support ring has a groove, which is used to install the reinforcement hoops.

In a preferred embodiment of the present invention, the rim assembly comprises a hub, a plurality of spokes extended outwardly from the hub, and the buckling part disposed at the outer end of each of the spokes.

In a preferred embodiment of the present invention, every spoke is made up of flat plates. A plane where the flat plates are located in is basically parallel with the central axis of the hub.

In a preferred embodiment of the present invention, the buckling parts are extended along a circumferential direction of the roller and two circumferential outer ends of the buckling part protrude from the corresponding spoke.

In a preferred embodiment of the present invention, an inner side of the hub has a convex separator, which is used to separate the two bearings to two ends of axial direction.

In a preferred embodiment of the present invention, the roller also comprises a dismounting tool. The dismounting tool has pressing discs as many as the elastic accommodating parts. The pressing discs are used to squeeze the elastic accommodating parts to release a connection between the elastic accommodating parts and the buckling parts.

In a preferred embodiment of the present invention, the dismounting tool is installed to the rim assembly in a detachable manner; the rim assembly comprises a hub, a plurality of spokes extended outwardly from the hub, and the buckling part disposed at the outer end of each of the spokes.

In a preferred embodiment of the present invention, the spoke adopts a hollow structure, and the dismounting tool has a plurality of toggle pieces for insertion into the hollows.

The roller provided by the present invention has a rim assembly and a tire assembly connected in a detachable manner. The tire assembly can be replaced alone to realize repeated use. Moreover, the rim assembly may be optimized to suit concrete application occasions. For example, the roller is optimized to make it particularly applicable to in-line roller skates.

BRIEF DESCRIPTION OF THE DRAWINGS

In order to more clearly describe the embodiments of the present invention or the technical schemes in prior art, below the accompanying drawings needing to be used in the description of embodiments or prior art are introduced briefly. Obviously, the accompanying drawings in the following description are only some embodiments of the present invention, and those skilled in the art can also obtain other accompanying drawings based on these accompanying drawings without inventive labor.

DETAILED DESCRIPTION OF PREFERRED EMBODIMENTS

Below the rollers of an in-line roller skate are taken for example to describe the present invention. It should be noted that the rollers of the present invention may also be used in other fields, particularly on the application occasions where the rollers need to have friction with the ground and endure lateral pressure.

Figure 1:
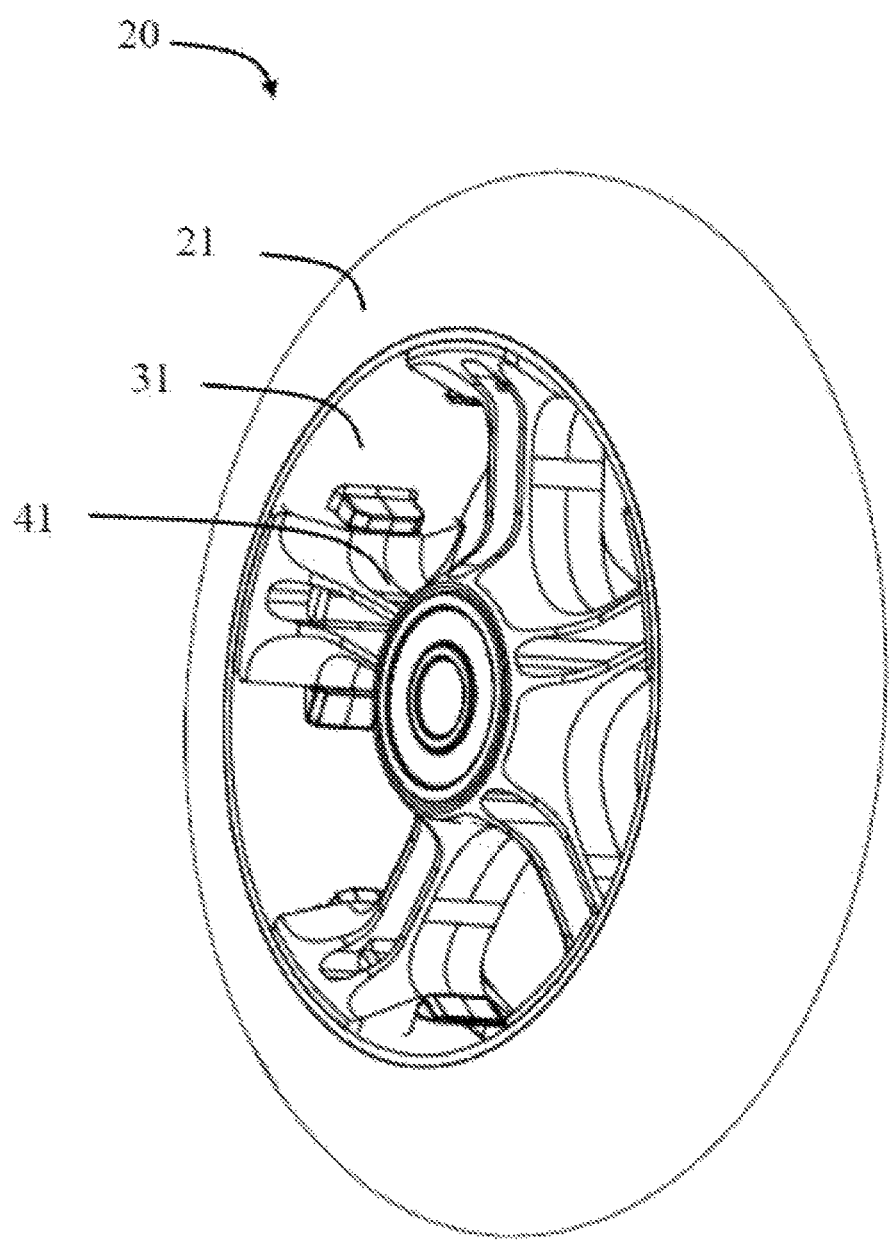
FIG. 1 shows the roller provided in the first embodiment of the present invention, the roller comprises a rim assembly and a tire assembly.
Figure 2:
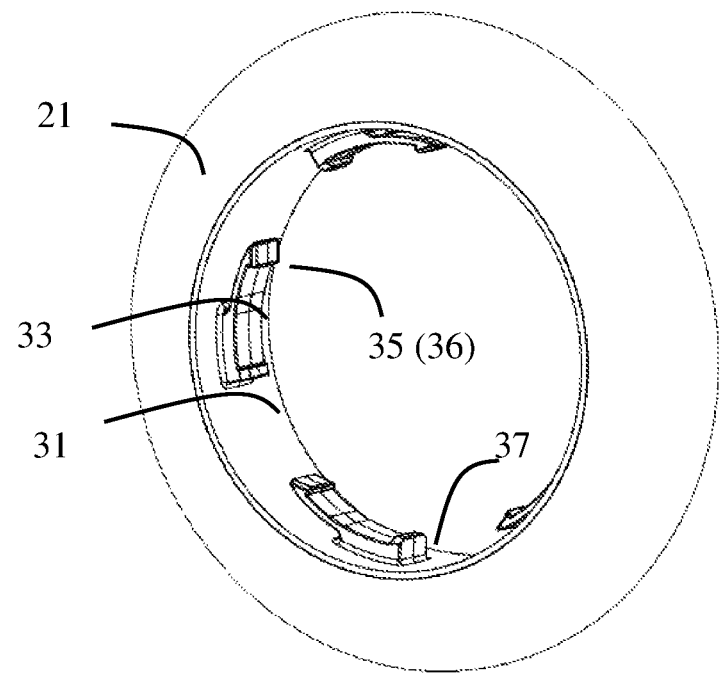
FIG. 2 and FIG. 3 show the tire assembly of the roller shown in FIG. 1, the tire assembly comprises a support ring and a tire.
Figure 3:
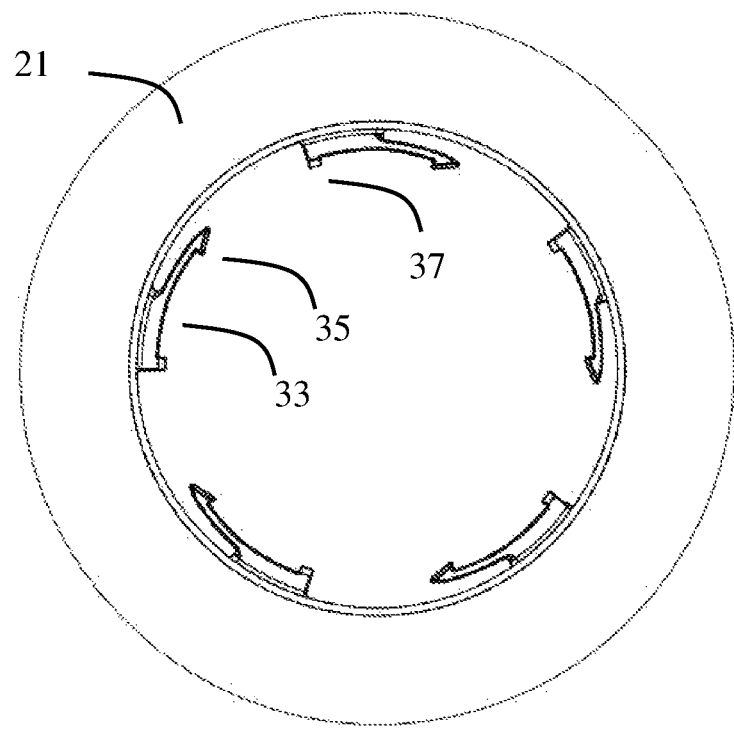

In reference to FIG. 1, a roller 20 provided in the first embodiment of the present invention comprises a rim assembly 41 and a tire assembly. The tire assembly comprises a support ring 31 and a tire 21 installed on the periphery of the support ring. The support ring 31 and the rim assembly 41 are detachably connected by a buckle structure. Specifically, the rim assembly 41 is defined herein as the radially outer edge of a wheel on which a tire is fitted.

In reference to FIG. 2, FIG. 3, FIG. 8 and FIG. 9, the buckle structure comprises a plurality of elastic accommodating parts 33 disposed on the inner side of supporting ring 31, and a plurality of buckling parts 47 disposed in the rim assembly 41. The Elastic accommodating parts 33 and the buckling parts 47 are detachably connected.

Specifically, the elastic accommodating parts 33 protrude out of the inner side of support ring 31, and two ends of each elastic accommodating part 33 are separately provided with a protruding first limiting block 35 and a protruding second limiting block 37. Each of the buckling parts 47 is limited by the first limiting block 35 and the second limiting block 37. The buckling part 47 is also provided with a buckling groove 48 to accommodate the elastic accommodating part 33. The side wall of the buckling groove 48 limits the elastic accommodating part 33, and the first limiting block 35 and the second limiting block 37 limit the buckling part 47 to prevent circumferential and axial relative movement of the support ring 31 and the rim assembly 41.

Further, the end of the elastic accommodating part 33, which has the first limiting block 35, is a free end, and a surface 36 of the first limiting block 35, which is far from the second limiting block 37, is tilted so that the buckling groove 48 of the buckling part 47 slides to the second limiting block 37 along this tilted surface 36 and makes the buckling part 47 enter the installation position limited and defined by the first limiting block 35 and the second limiting block 37.

During assembly, the tire assembly is mounted at the periphery of the rim assembly 41 to make each elastic accommodating part 33 of the tire assembly located between the two buckling parts 47 corresponding to the rim assembly 41. Then the tire assembly is rotated to make the buckling part 47 slide to the second limiting block along the tilted surface of first limiting block 35 corresponding to the elastic accommodating part 33, and the elastic accommodating part 33 into buckling groove 48 of this buckling part 47. The tire assembly is rotated continuously till the buckling part 47 is limited by the first limiting block 35 and the second limiting block 37. One end of elastic accommodating part 33 is a free end, so when rotation is in place, this free end usually will knock at the buckling part 47 under the action of elasticity, thus giving off a clear knocking sound to inform the user that the tire assembly is installed to the position. Preferably, the two ends of buckling part 47 have appropriate clearance from the first limiting block 35 and the second limiting block 37 in order to generate a clear sound. It is preferred that the clearances between the two ends of the buckling part 47 and the first limiting block 35/second limiting block 37 is not greater than 0.1 mm.

Further, at the entrance of the buckling groove 48 (i.e.: an end of the buckling groove 48), an oblique plane 49 with smooth transition is disposed to make for the slide-in of the elastic accommodating part 33.

Figure 4:
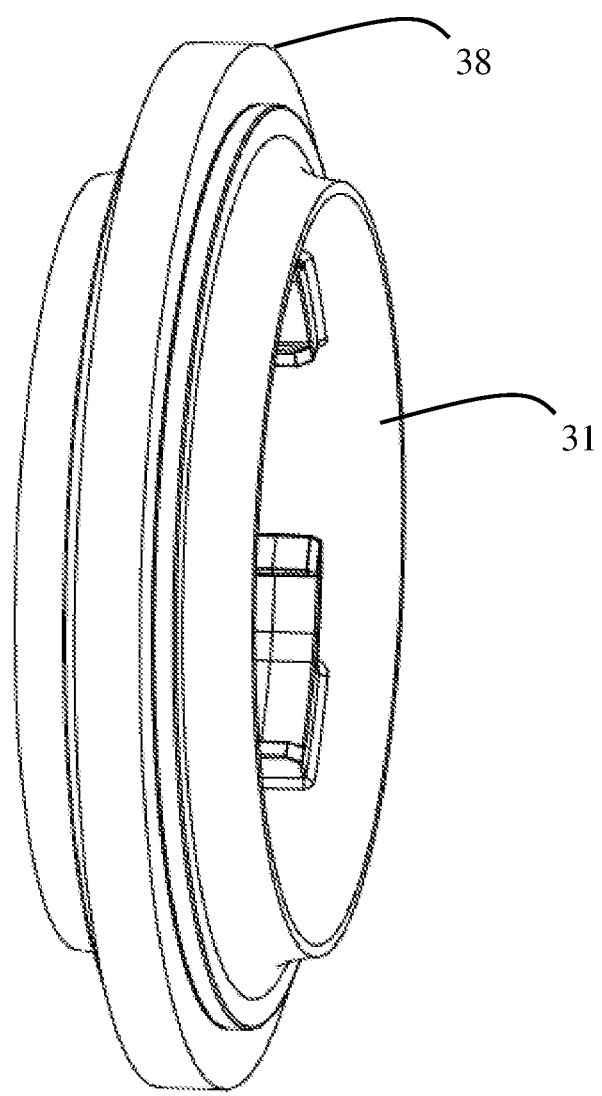
FIG. 4 and FIG. 5 show the support ring and tire respectively of the tire assembly shown in FIG. 2.
Figure 5:
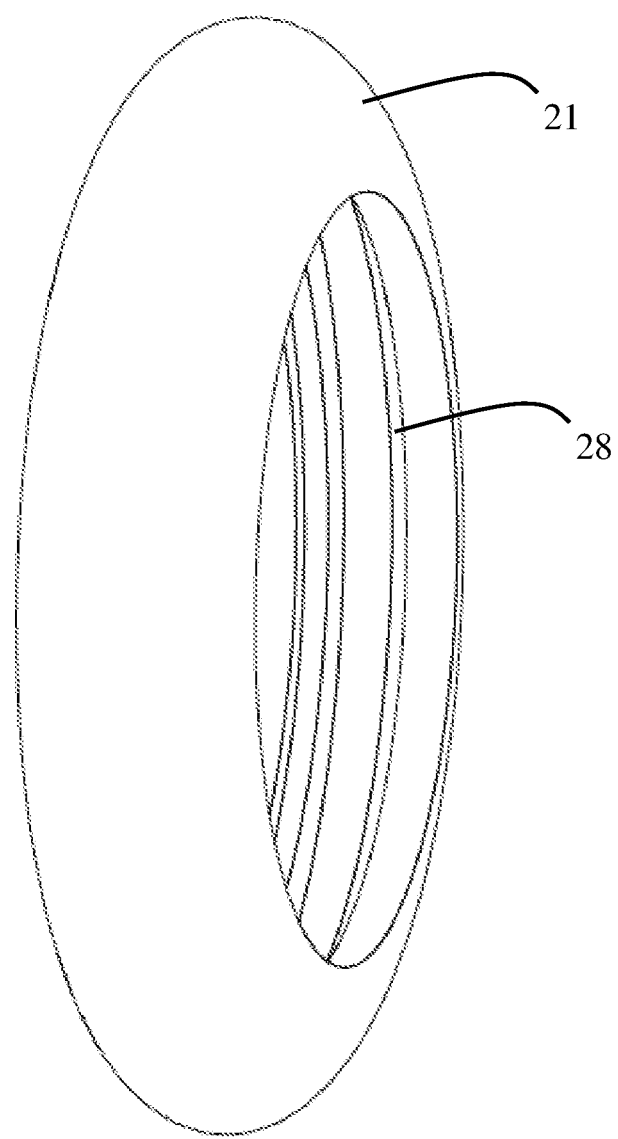

In reference to FIG. 4 and FIG. 5, an outer circumferential surface of the support ring 31 has a protruded reinforcement hoop 38, and an inner circumferential surface of the tire 21 has a receiving groove 28 to inlay the reinforcement hoop 38.

Figure 6:
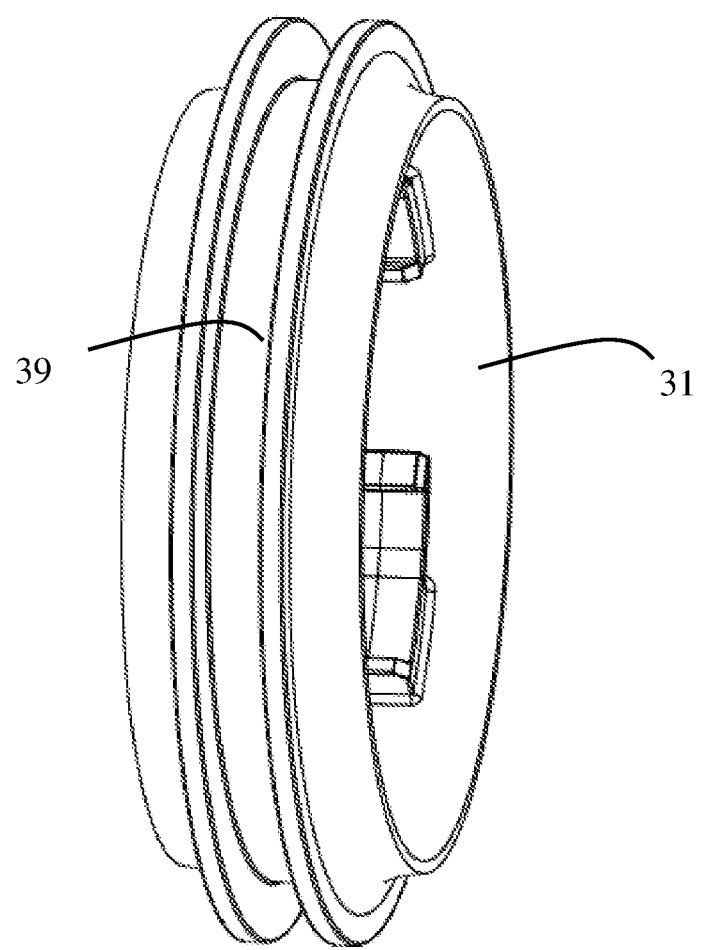
FIG. 6 and FIG. 7 show the ring and reinforcement hoop respectively of the support ring shown in FIG. 4.
Figure 7:
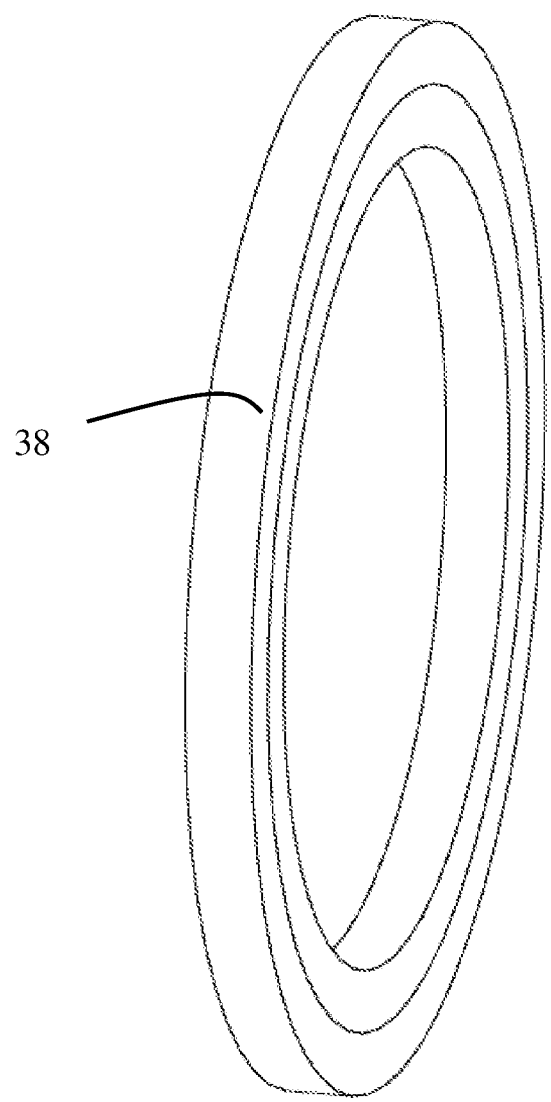

In reference to FIG. 6 and FIG. 7, in this embodiment, the support ring 31 and the reinforcement hoop 38 are made of different materials, and the outer circumferential surface of support ring 31 has a groove 39 to mount the reinforcement hoop 38.

Figure 8:
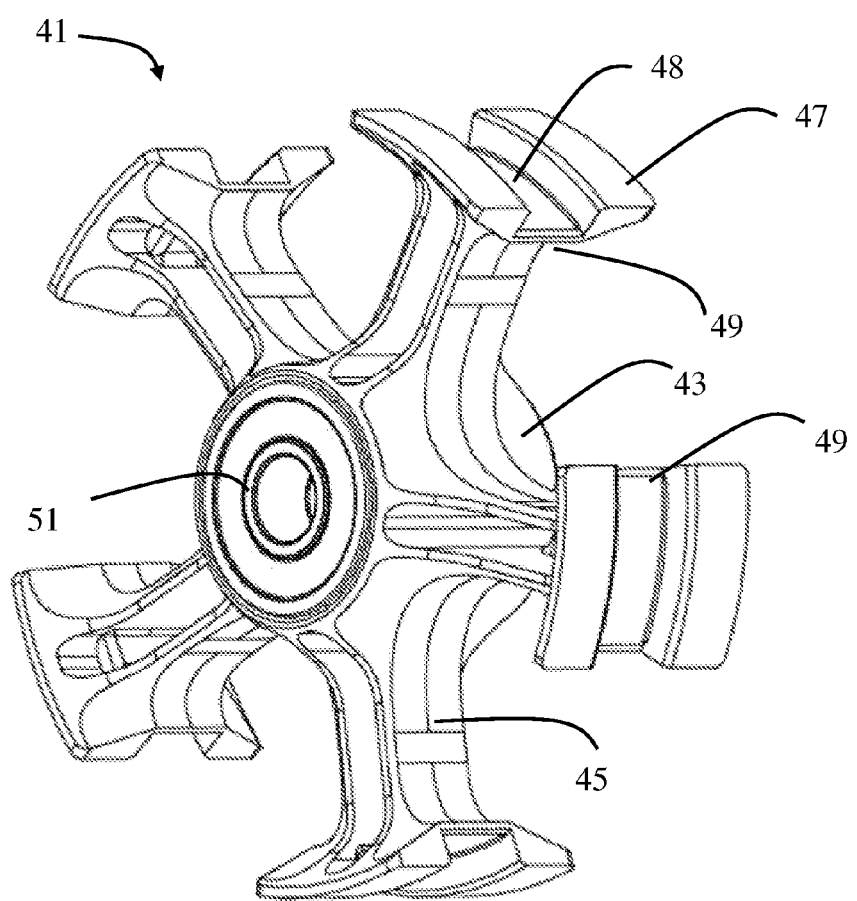
FIG. 8 shows the rim assembly (including bearing) of the roller shown in FIG. 1.
Figure 9:
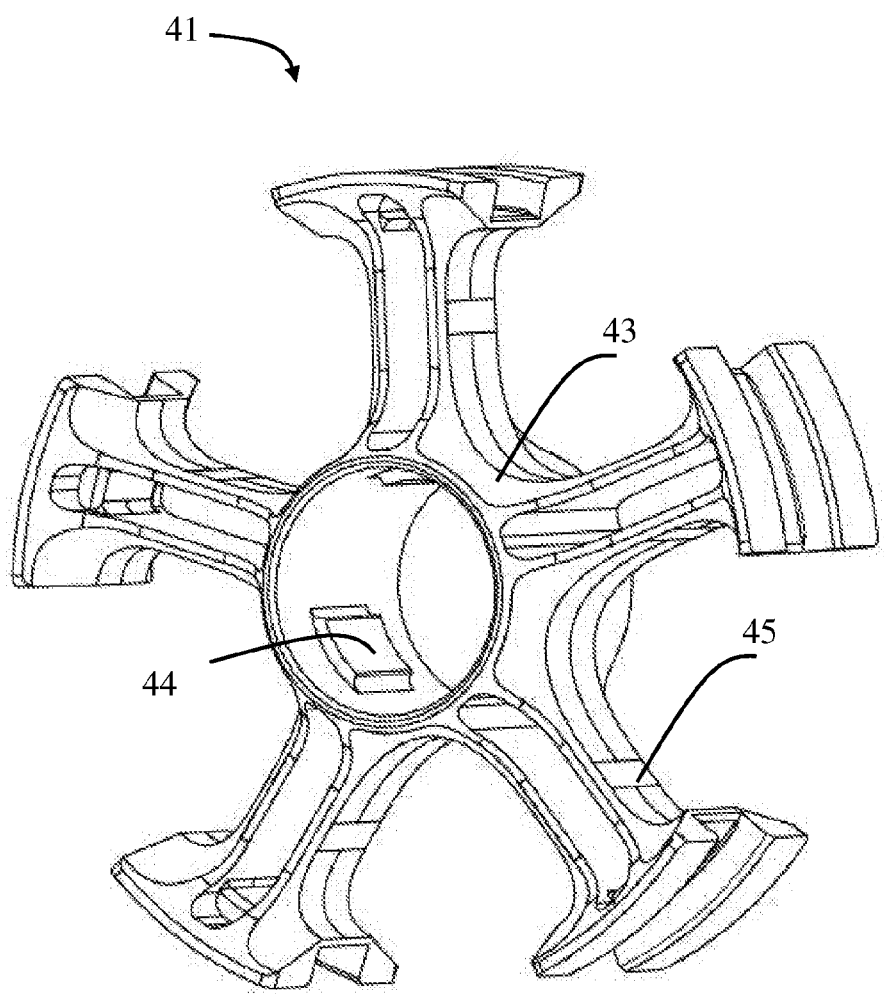
FIG. 9 shows the rim assembly of which bearings are removed.
Figure 10:
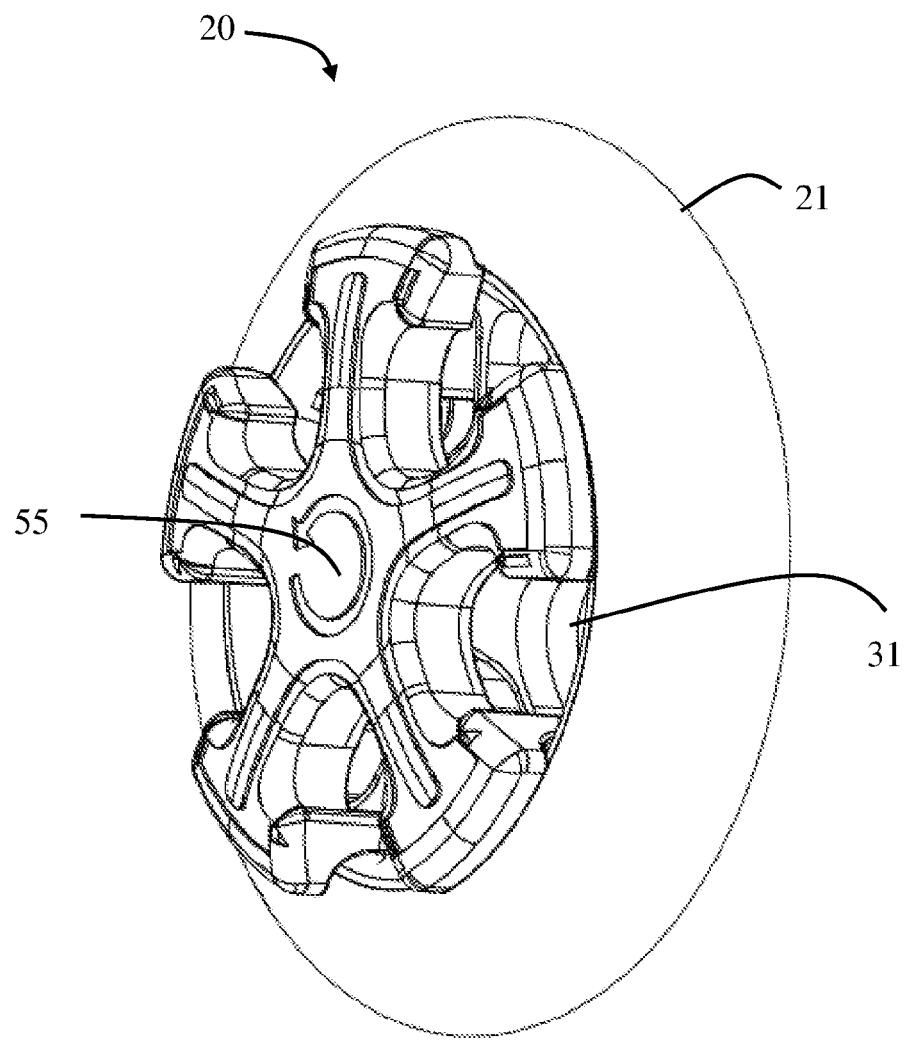
FIG. 10 and FIG. 11 show the roller provided in the second embodiment of the present invention. The roller comprises a rim assembly, a tire assembly and a dismounting tool.
Figure 11:
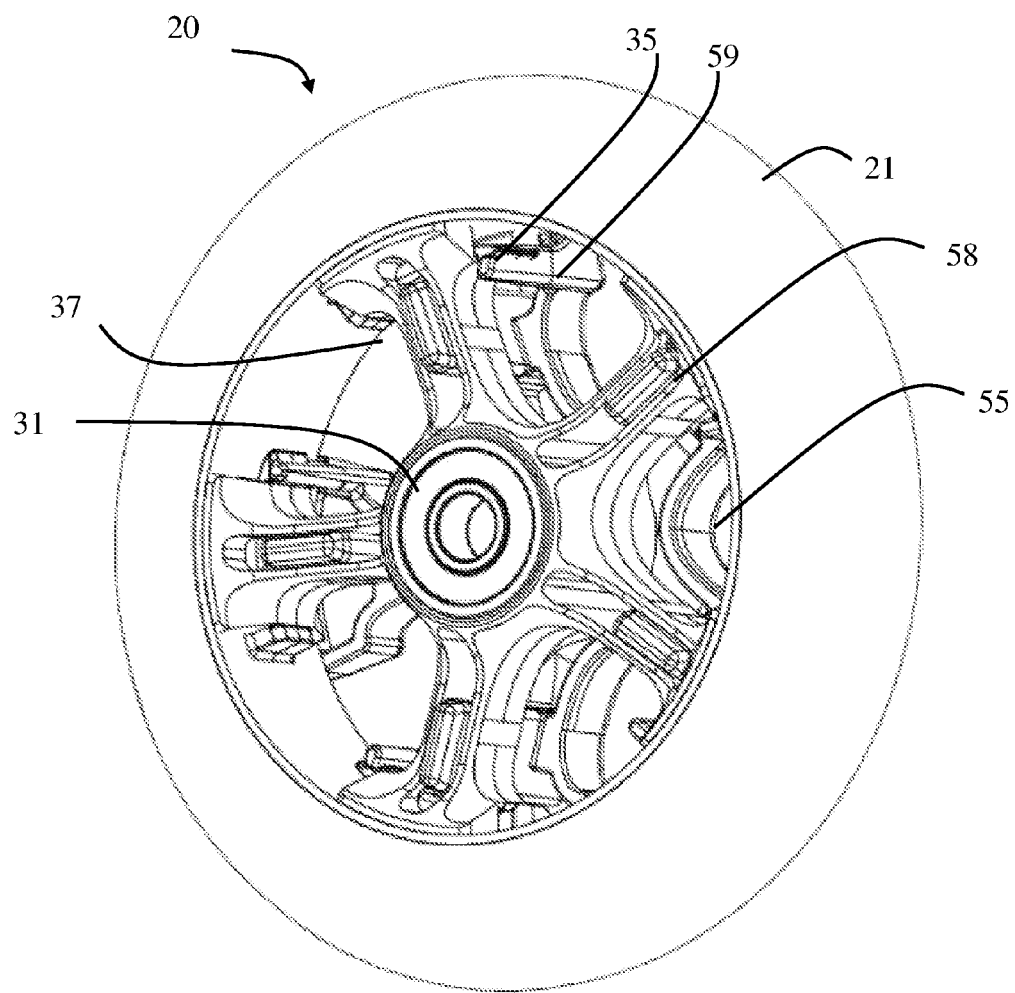
Figure 12:
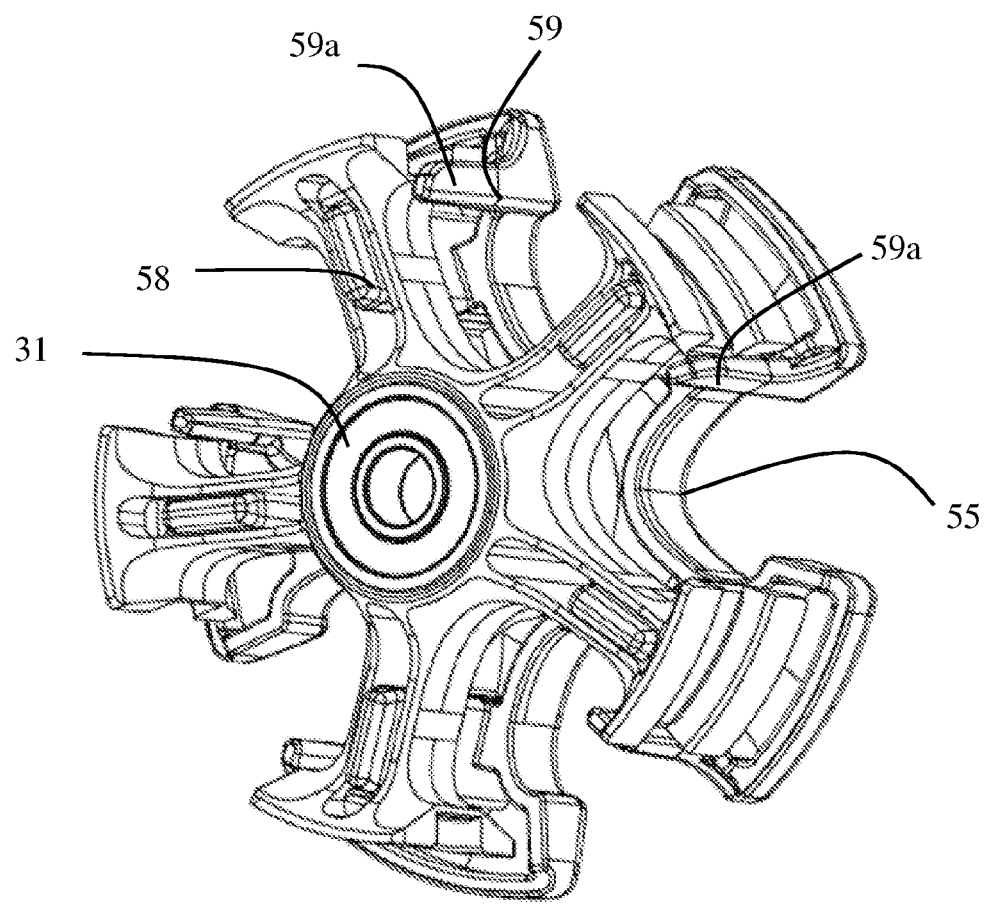
FIG. 12 shows the rim assembly and dismounting tool of the roller shown in FIG. 11.
Figure 13:
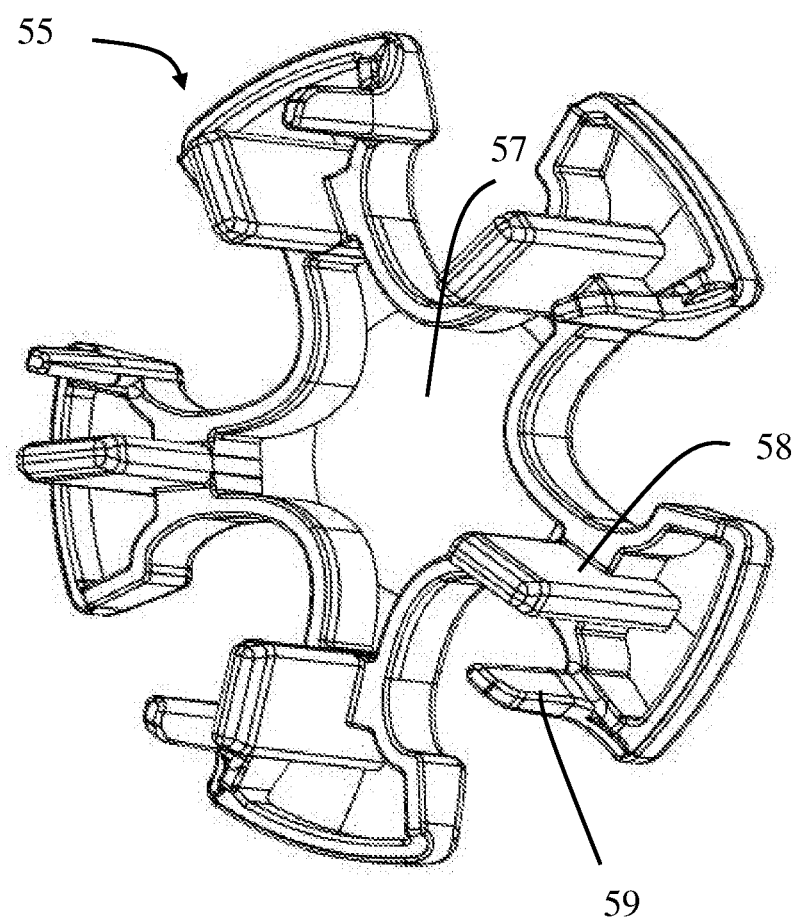
FIG. 13 shows the dismounting tool of the roller shown in FIG. 11.

In reference to FIG. 8 and FIG. 9, the rim assembly 41 comprises a hub 43, a plurality of spokes 45 extended outwardly from the hub 43, and buckling parts 47 disposed at the outer end of every spoke 45. Each of the spokes 45 is made up of two flat plates. A plane where the flat plates are located is basically parallel with the central axis of the hub 43. The buckling parts 47 are extended along the circumferential direction of the roller and the two circumferential outer ends of each buckling part 47 protrude from the two flat plates of the corresponding spoke 45. The advantage of this design: the overall weight is minimized while enough strength of the spokes 45 is maintained to endure the external forces from all directions. Moreover, in the aspect of weight distribution, the buckling parts 47 assume a weight proportion as large as possible. The larger the weight proportion of the buckling parts 47 is, the more easily the inertia rotation of the roller will be maintained, thereby improving the performance of the roller skate. For example, when the user applies force by his two feet alternately, the roller can still maintain a high speed after it is lifted off the ground, thereby avoiding too fast reduction of roller speed. It should be noted that a spoke 75 is not limited to comprising two flat plates. For example, every spoke 75 may be composed of one flat plate or more than two flat plates.

In order to further improve the performance of the roller, the roller of the present invention may adopt a configuration of dual bearings 51 and the two bearings 51 are received in the two axial ends of the hub 43. The inner side of hub 43 has a convex separator 44, which is used to separate the two bearings 51 to the two ends of axial direction.

In reference to FIG. 10~FIG. 13, the roller provided in the second embodiment of the present invention also comprises a supporting dismounting tool 55. The dismounting tool 55 is separated from the roller normally and is used only when the tire assembly needs to be disassembled and replaced. Concretely, the dismounting tool 55 comprises a cover 57, and a plurality of pressing discs 59 and toggle pieces 58 stretching out from one side of a cover 57. Preferably, the pressing discs 59 and the elastic accommodating parts 33 have a same quantity, and the toggle pieces 58 and the spokes 45 have a same quantity. In this embodiment, there are 5 spokes 45, 5 toggle pieces 58 and 5 pressing discs 59. When the tire assembly needs to be disassembled or replaced, dismounting tool 55 is installed on the roller in a buckled manner to ensure the toggle pieces 58 are inserted to hollows of the corresponding spokes 45. The pressing discs 59 are located at the first limiting blocks 35 of the corresponding elastic accommodating parts 33. More concretely, edge 59a of the pressing disc 59 contacts the tilted surface 36 of the first limiting block 35. The edge 59a of the pressing disc 59 is also a smooth tilted edge, so when the dismounting tool 55 is pushed along the axial direction of the roller, the tilted edge 59a of the pressing disc 59 gradually squeezes the first limiting block 35 of the elastic accommodating part 33. As the end of the elastic accommodating part 33, which has the first limiting block 35, is a free end, this free end and the first limiting block 35 are bent outwardly along the radial direction of the roller under the squeeze of the pressing disc 59, thereby releasing the limiting of the first limiting block 35 to the buckling part 43. Then, the dismounting tool 55 is rotated along the direction from the second limiting block 37 to the first limiting block 35, thereby the rotating spoke 45 and the buckling part 43 through the toggle piece 58 to release the connection between the elastic accommodating part 33 and the buckling part 47 (make the buckling part 43 and the elastic accommodating part 33 separated). Thus the tire assembly and the rim assembly 41 are dismounted. It should be noted that the main role of the toggle pieces 58 is to toggle the spokes 45 to make the hub 43 rotate relative to the tire assembly. Therefore, the toggle pieces 58 may be fewer than the spokes 45.

In the present invention, the hub 43, the spokes 45 and the buckling parts 47 may be made of aerolite, AL7068-T6511 aerolite for example so that the hub 43, the spokes 45 and the buckling parts 47 have enough strength and ideal weight. Preferably, the tire 21 is a PU rubber tire, to raise weight proportion of the tire 21 to the whole roller. The reinforcement hoop 38 may also be made of PU rubber (softer PU rubber). The support ring 31 is made of engineering plastic (PA66 nylon plastic). It should be noted that the materials of the hub 43, the spokes 45 and the buckling parts 47 are not limited to aluminum alloy and may be various substances or materials.

The present invention is further described in details above by referring to preferred embodiments, but it shall not be deemed that the implementation of the present invention is limited to these descriptions. Those skilled in the art may make simple modifications or substitutions under the precondition of not departing from the spirit of the present invention. All these modifications or substitutions shall be deemed to be in the protective scope of the present invention.

What is claimed is:

1. A roller, comprising a rim assembly (41) and a tire assembly, wherein the tire assembly comprises a support ring (31) and a tire (21) mounted at the periphery of the support ring, the support ring (31) and the rim assembly (41) are detachably connected by a buckle structure;

and wherein the buckle structure comprises a plurality of elastic accommodating parts (33) disposed on an inner side of the supporting ring (31), and a plurality of buckling parts (47) disposed at the rim assembly (41), the elastic accommodating parts (33) and buckling parts (47) are detachably connected;

and wherein the roller further comprises a dismounting tool (55) having pressing arms (59) substantially shaped as L as many as the elastic accommodating parts (33) for squeezing the elastic accommodating parts (59) so as to release a connection between the elastic accommodating parts (33) and the buckling parts (47).

2. The roller according to claim 1, wherein each of the elastic accommodating parts (33) protrudes out of the inner side of the support ring (31), and a first end of the elastic accommodating part (33) is provided with a protruding first limiting block (35) and a second end of the elastic accommodating part (33) is provided with a protruding second limiting block (37), the buckling parts (47) are limited by the first limiting blocks (35) and the second limiting blocks (37).

3. The roller according to claim 2, wherein each of the buckling parts (47) is also provided with a buckling groove (48) to accommodate the elastic accommodating part (33), a side wall of the buckling groove (48) limits the elastic accommodating part (33), and the first limiting block (35) and the second limiting block (37) limit the buckling part (47) to prevent circumferential and axial movement of the support ring (31) relative to the rim assembly (41).

4. The roller according to claim 2, wherein the first end of the elastic accommodating part (33) having the first limiting block (35) is a free end.

5. The roller according to claim 1, wherein the circumferential surface of the support ring (31) has a protruded reinforcement hoop (38), which is inlaid in a corresponding receiving groove (28) deposited in the tire (21).

6. The roller according to claim 5, wherein the support ring (31) and the reinforcement hoop (38) are made of different materials, an outer circumferential surface of the support ring (31) has a groove (39) for installing the reinforcement hoop (38).

7. The roller according to claim 1, wherein the spokes (45) are extended outwardly from the hub (43), and the buckling part (47) is disposed at an outer end of each of the spokes (45).

8. The roller according to claim 7, wherein each of the spokes (45) is made up of a flat plate, a plane where the flat plates are located is parallel with the central axis of the hub (43).

9. The roller according to claim 8, wherein the buckling parts (47) are extended along the circumferential direction of the roller and two circumferential outer ends of the buckling part (47) protrude out of the corresponding spoke (45).

10. The roller according to claim 7, wherein an inner side of the hub (43) has a convex separator (44) for separating two bearings (51) to two ends of the axial direction.

11. The roller according to claim 1, wherein the dismounting tool (55) is installed to the rim assembly (41) in a detachable manner; and wherein the spokes (45) are extended outwardly from the hub (43), and the buckling part (47) is disposed at the outer end of each of the spokes (45).

12. The roller according to claim 11, wherein the spoke (45) adopts a hollow structure and the dismounting tool (55) has a plurality of toggle pieces (58) for insertion into the hollow structure.

* * * * *